United States Patent
Lee et al.

(10) Patent No.: US 10,598,857 B2
(45) Date of Patent: Mar. 24, 2020

(54) TECHNIQUES FOR REDUCING POLARIZATION, WAVELENGTH AND TEMPERATURE DEPENDENT LOSS, AND WAVELENGTH PASSBAND WIDTH IN FIBEROPTIC COMPONENTS

(71) Applicant: DICON FIBEROPTICS, INC., Richmond, CA (US)

(72) Inventors: Ho-Shang Lee, El Sobrante, CA (US); Min Chieh Lu, Kaoshiung (TW); Yu-Sheng Yang, Kaohsiung (TW); Chen-Wen Ho, Kaohsiung (TW)

(73) Assignee: DICON FIBEROPTICS, INC., Richmond, CA (US)

( * ) Notice: Subject to any disclaimer, the term of this patent is extended or adjusted under 35 U.S.C. 154(b) by 0 days.

(21) Appl. No.: 16/225,725

(22) Filed: Dec. 19, 2018

(65) Prior Publication Data

US 2019/0146156 A1    May 16, 2019

Related U.S. Application Data

(63) Continuation of application No. 15/226,164, filed on Aug. 2, 2016, now abandoned.

(51) Int. Cl.
| | |
|---|---|
| *G02B 6/26* | (2006.01) |
| *G02B 6/27* | (2006.01) |
| *G02B 6/293* | (2006.01) |

(52) U.S. Cl.
CPC .......... *G02B 6/262* (2013.01); *G02B 6/2793* (2013.01); *G02B 6/29397* (2013.01); *G02B 6/29398* (2013.01); *G02B 6/266* (2013.01)

(58) Field of Classification Search
CPC ...... G02B 6/3825; G02B 6/132; G02B 6/136; G02B 6/264
See application file for complete search history.

(56) References Cited

U.S. PATENT DOCUMENTS

| | | |
|---|---|---|
| 6,081,638 A | 6/2000 | Zhou |
| 6,628,856 B1 | 9/2003 | Costello et al. |
| (Continued) | | |

OTHER PUBLICATIONS

"Variable Optical Attenuators," DiCon Fiberoptics, Inc., [retrieved Jun. 17, 2016], 14 pages, http://web.archive.org/web/20160617191537/http://www.diconfiberoptics.com/products/main_attenuators.php.

(Continued)

*Primary Examiner* — Sung H Pak
*Assistant Examiner* — Hoang Q Tran
(74) *Attorney, Agent, or Firm* — Vierra Magen Marcus LLP

(57) ABSTRACT

A pin hole or aperture is located or formed adjacent to the end surface of one or more of the input ports or fibers, or adjacent to one or more of the output ports or fibers, of a fiberoptic component. The aperture allows light to enter (or exit) the core of the associated fiber, and the non-transparent layer that surrounds the aperture blocks light from entering or exiting the cladding layer of the associated fiber. This blocking of the evanescent field in the cladding layer serves to reduce the polarization, wavelength, and temperature dependencies of the light coupling to the output port(s) or fiber(s) of the optical component. It can also reduce the passband width of the selected wavelength in tunable optical filter applications. The non-transparent layer surrounding the aperture can be made reflective, and light that is reflected by the non-transparent layer can be used for optical power monitoring.

7 Claims, 7 Drawing Sheets

(56) References Cited

U.S. PATENT DOCUMENTS

| | | | |
|---|---|---|---|
| 6,838,738 | B1 | 1/2005 | Costello et al. |
| 7,184,619 | B2 | 2/2007 | Kazama et al. |
| 7,346,240 | B1 | 3/2008 | He et al. |
| 7,600,924 | B2 * | 10/2009 | Hama .................. G02B 6/4298 385/58 |
| 7,899,330 | B2 | 3/2011 | Ye et al. |
| 2002/0031299 | A1 | 3/2002 | Hatakoshi |
| 2004/0086219 | A1 * | 5/2004 | Qiu ...................... G02B 6/3514 385/21 |
| 2004/0120646 | A1 | 6/2004 | Fushimi |
| 2004/0146298 | A1 | 7/2004 | Ikegame |
| 2011/0142395 | A1 | 6/2011 | Fortusini et al. |
| 2013/0230280 | A1 | 9/2013 | Kadar-Kallen |
| 2016/0264460 | A1 | 9/2016 | Kufner et al. |
| 2017/0276877 | A1 | 9/2017 | Lee et al. |
| 2017/0363813 | A1 | 12/2017 | Lee et al. |
| 2018/0039023 | A1 | 2/2018 | Lee et al. |

OTHER PUBLICATIONS

Lee et al., "Integrated Optical Components With Variable Attenuation or Switching, and Tap Detector Functions," U.S. Appl. No. 15/184,722, filed Jun. 16, 2016, 32 pages.

Lee et al., "Tunable Three-Port Wavelength Splitter, for Optical Communication and the Multiplexing and De-Multiplexing of Optical Signals," U.S. Appl. No. 15/081,294, filed Mar. 25, 2016, 41 pages.

Non-final Office Action dated Feb. 24, 2017, U.S. Appl. No. 15/226,164, filed Aug. 2, 2016.

Response to Non-final Office Action dated Jun. 16, 2017, U.S. Appl. No. 15/226,164, filed Aug. 2, 2016.

Final Office Action dated Oct. 20, 2017, U.S. Appl. No. 15/226,164, filed Aug. 2, 2016.

Response to Final Office Action dated Jan. 9, 2018, U.S. Appl. No. 15/226,164, filed Aug. 2, 2016.

Non-final Office Action dated Feb. 9, 2018, U.S. Appl. No. 15/226,164, filed Aug. 2, 2016.

Response to Non-final Office Action dated May 21, 2018, U.S. Appl. No. 15/226,164, filed Aug. 2, 2016.

Final Office Action dated Sep. 20, 2018, U.S. Appl. No. 15/226,164, filed Aug. 2, 2016.

Non-final Office Action dated Dec. 14, 2018, U.S. Appl. No. 15/184,722, filed Jun. 16, 2016.

Response to Office Action dated Mar. 5, 2019, U.S. Appl. No. 15/184,722, filed Jun. 16, 2016.

Notice of Allowance dated Jul. 22, 2019, U.S. Appl. No. 15/184,722, filed Jun. 16, 2016.

* cited by examiner

TECHNIQUES FOR REDUCING POLARIZATION, WAVELENGTH AND TEMPERATURE DEPENDENT LOSS, AND WAVELENGTH PASSBAND WIDTH IN FIBEROPTIC COMPONENTS

CLAIM OF PRIORITY

This application is continuation application of U.S. patent application Ser. No. 15/226,164, entitled "TECHNIQUES FOR REDUCING POLARIZATION, WAVELENGTH AND TEMPERATURE DEPENDENT LOSS, AND WAVELENGTH PASSBAND WIDTH IN FIBEROPTIC COMPONENTS," filed Aug. 2, 2016 and published as US 2018/0039023 on Feb. 8, 2018, by Lee et al., incorporated by reference herein in its entirety.

CROSS-REFERENCE TO RELATED APPLICATION

This application is related to U.S. patent application Ser. No. 15/184,722, entitled "INTEGRATED OPTICAL COMPONENTS WITH VARIABLE ATTENUATION OR SWITCHING, AND TAP DETECTOR FUNCTIONS," filed Jun. 16, 2016 and published as US 2017/0363813 on Dec. 21, 2017 by Lee et al., incorporated by reference herein in its entirety.

BACKGROUND

The following is related generally to optical or fiberoptic components used in optical communication networks and, more specifically, to reducing polarization, wavelength, and temperature dependent loss in fiberoptic components.

Fiberoptic components such as Variable Optical Attenuators (VOAs), optical switches, and tunable optical filters are widely deployed in optical networks, typically in the 1550 nm or 1310 nm wavelength windows, as well as other wavelength ranges. In wavelength-division-multiplexed optical networks where multiple wavelengths are used, so that multiple channels of information can be transmitted or carried on a single fiber, Variable Optical Attenuators are used at various points in the network, to manage the optical power of the multiple optical signals or wavelengths. Optical switches are used to redirect or re-route signals that are transmitted or carried on fibers, by establishing connections between fibers. Tunable optical filters are used to select specific wavelengths or wavelength ranges, and may also be used to scan multiple wavelengths in channel or fiber monitoring applications.

Optical beam-steering technologies of various kinds are often used to implement fiberoptic components such as VOAs, optical switches, and tunable optical filters. For example, MEMS (Micro-Electro-Mechanical Systems) tilting mirrors are often used to steer light from one or more input ports or fibers of a fiberoptic component, towards one or more output ports or fibers. In a MEMS-based VOA, the beam is steered toward an output port, and the degree of alignment of the beam to the output port determines the amount of attenuation. In a MEMS-based optical switch, the intent is usually to have minimal insertion loss, as the beam is steered to the desired output port. Similarly, in a tunable optical filter, the intent is usually to have minimal insertion loss of the selected wavelength or wavelength range, as it is steered to the output port. Also, in the case of some tunable optical filters, the coupling of light to the output port and the geometry of the optical path, serve to determine the shape and width of the selected wavelength's passband.

In fiberoptic components that make use of beam-steering, the coupling of light from the one or more input ports or fibers, to the one or more output ports or fibers, depends on many factors, including the configuration and design of optical elements in the path between the input and output ports, as well as the coupling of the steered beam to the output port(s) or fiber(s). The loss through the fiberoptic component may be dependent on the polarization of the input light, wavelength, and even the ambient temperature. In the case of tunable optical filter components, the coupling of light to the output port(s) or fiber(s) may also determine the shape and width of the filter's passband. The reduction of polarization dependent loss (PDL), wavelength dependent loss (WDL), and temperature dependent loss (TDL) has great value to the designers and implementers of fiberoptic networks. Similarly, improvements to the passband characteristics of tunable optical filter components, such as providing greater isolation of adjacent wavelength channels, also has great value.

In many of the optical network applications of Variable Optical Attenuators, as well other fiberoptic components, it is often necessary or desirable to monitor the optical power of the signal, either on the input side of the component, or (more typically) on the output side. For this reason, it is common practice to use an optical tap and an optical power detector, at either the input or output of an optical component or function. The optical tap splits off a small portion of the optical signal. The split-off optical signal is then directed to an optical detector device, which converts the optical power to an electrical signal, from which the optical power of the signal can be determined. The remainder of the optical signal (the portion that was not split off and directed to the detector circuit) is than passed on to the rest of the network. The portion of the optical power that was split off by the optical splitter, or tap, represents a source of insertion loss to the desired/intended optical signal. Consequently, optical systems could benefit from improvements in providing a tap function for monitoring purposes.

SUMMARY

An optical component has one or more optical waveguides, including a first optical waveguide having an inner core extending in a first direction that is radially surrounded by an outer cladding along the first direction, the first optical waveguide terminating in a first end. The inner core has a higher index of refraction than the index of refraction of the outer cladding. A non-transparent end structure covers the first end of the first optical waveguide and has a transparent aperture for at least a portion of inner core.

A ferrule structure for an optical fiber includes one or more through-holes for the embedding of a corresponding one or more optical fibers that are inserted into a first end of the ferrule structure. The ferrule structure also includes an end plate covering a second end of a first of the through-holes, the end plate having a non-transparent outer surface with a central transparent aperture.

In a method of forming an optical component, a first end of an optical waveguide is coated with a photoresist material. The optical waveguide has an inner core extending in a first direction that is radially surrounded by an outer cladding along the first direction, where the optical waveguide terminates at the first end. The inner core has a higher index of refraction than the index of refraction of the outer cladding. Light is subsequently transmitted through the optical waveguide to thereby expose at least a portion of the photoresist material. Non-exposed portions of the photoresist material are removed from the first end of the optical waveguide. A non-transparent coating is deposited over the first end of the optical waveguide, including the exposed portion of the photoresist material. The exposed portion of the photoresist, including the non-transparent coating deposited over the exposed portion of the photoresist, is subsequently removed to thereby form an aperture in the non-transparent coating.

Various aspects, advantages, features and embodiments are included in the following description of exemplary examples thereof, which description should be taken in conjunction with the accompanying drawings. All patents, patent applications, articles, other publications, documents and things referenced herein are hereby incorporated herein by this reference in their entirety for all purposes. To the extent of any inconsistency or conflict in the definition or use of terms between any of the incorporated publications, documents or things and the present application, those of the present application shall prevail.

DETAILED DESCRIPTION

The output of a fiberoptic component is typically dependent on the polarization and wavelength of the input light or optical signal, and may also depend on the ambient temperature, and other parameters. The techniques presented here relate to methods for reducing polarization, wavelength, and temperature dependent loss in fiberoptic components. These techniques can also be used to reduce the wavelength passband width in some types of fiberoptic components, and have application in optical power monitoring.

More specifically, a pin hole or aperture can be located or formed adjacent to the end surface of one or more of the input ports or fibers, or adjacent to one or more of the output ports or fibers, of a fiberoptic component. The pin hole or aperture allows light to enter (or exit) the core of the associated fiber, and the non-transparent layer that surrounds the pin hole or aperture blocks light from entering or exiting the cladding layer of the associated fiber. This blocking of the evanescent field in the cladding layer serves to reduce the polarization, wavelength, and temperature dependencies of the light coupling to the output port(s) or fiber(s) of the optical component. It can also reduce the passband width of the selected wavelength in tunable optical filter applications. The non-transparent layer surrounding the pin-hole or aperture can be made reflective (such as a metallic or other reflective material, such as a reflective dielectric), and the light that is reflected by the non-transparent layer can be used for optical power monitoring.

Figure 1A:
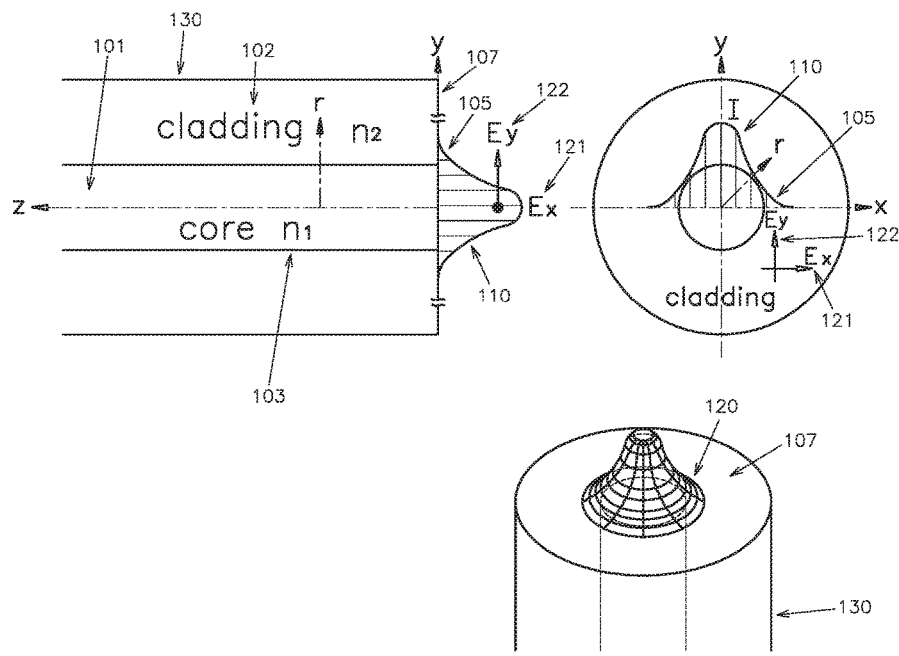
FIG. 1A illustrates the electric field power distribution of the fundamental mode in a single mode fiber.

As shown in FIG. 1A, an optical fiber 130, such as is used in optical communication networks, includes a transparent core 101 surrounded by a transparent cladding layer 102 that has a refraction index n2 that is lower than the refraction index n1 of the core 101. A majority of the light that passes down the fiber is confined in the core 101 by total internal reflection, occurring at the interface 103 of the core 101 and cladding 102, and the remaining small portion of light, referred to as an evanescent field, and indicated by 105, penetrates into the cladding layer 102 and decays out along the radial direction r. If the core of the fiber carries only one propagation mode, then the fiber is called a single-mode (SM) fiber. The fiber is called multi-mode (MM) fiber if it carries more than one propagation mode. In the following description, single-mode fiber is assumed in the drawings and description, for illustrative purposes. However, the techniques are applicable to multi-mode fibers as well, with similar physics.

For a single-mode (SM) fiber, the index $n_1$ in the core 101 can be either uniform (in which case it can be referred to as step-index) or non-uniform (for example, graded index fiber, having a maximum index of refraction at the core center). Similarly, the index $n_2$ of the cladding layer 102 can either be a uniform index or have a distribution. The electric field distribution and its corresponding power distribution (proportional to the square of the electric field) of the fundamental mode in a single-mode fiber, plotted as intensity I versus radial distance, is indicated by 110. Inset drawing 120 shows the perspective view of the power distribution, as emitted from a fiber end surface 107. The propagation mode can carry its electric field in any transverse polarization direction, which can be generally decomposed into two orthogonal directions, represented by $E_x$ and $E_y$, as indicated by 121 and 122, respectively. The core diameter of SM fibers used in optical communications is typically 9 micro-meters and the cladding diameter is typically 125 micro-meters.

Figure 1B:
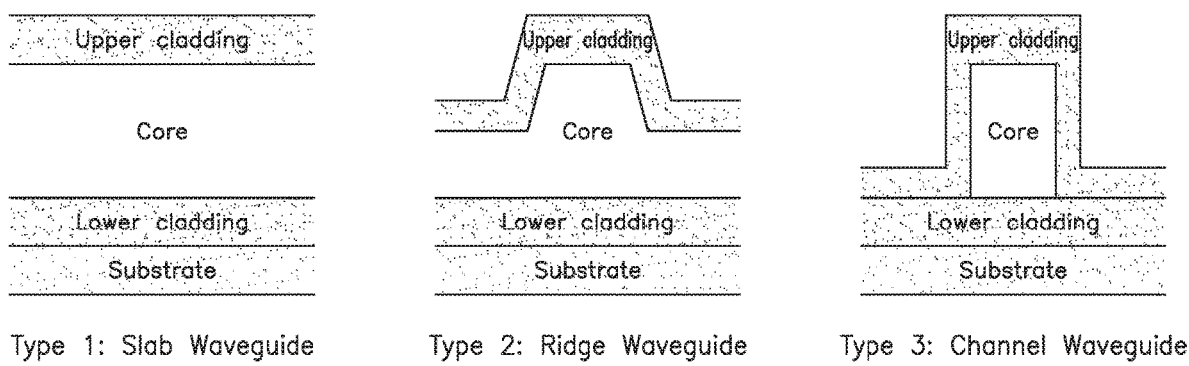
FIG. 1B shows three examples for cross-section geometries of planar waveguides.

The techniques described here also extend to other forms of optical or photonic waveguides, in addition to optical fiber. Optical or photonic waveguides can be formed in or on substrates, using a variety of materials and fabrication processes. Devices using optical or photonic waveguides are sometimes referred to as photonic integrated circuits (PICs) or photonic lightwave circuits (PLCs). Common materials used for optical or photonic waveguides include silicon and silica. The fabrication processes are similar to semiconductor fabrication processes, and include etching, deposition, oxidation, lithography, etc. Similar to optical fiber, optical or photonic waveguide structures have a core of relatively higher index of refraction, surrounded by cladding material with relatively lower index of refraction. The cross-sectional shape of the core may be rectangular, or square, or any number of shapes. The cladding that surrounds the core may also have different shapes and configurations. FIG. 1B gives some examples shown in cross-section, oriented such that the light would run into or out of the page. In each of these examples, the lower cladding is formed over the substrate, upon which the core is formed, either as a slab, a ridge shaped slab, or a channel-shaped core, over which an upper cladding is in turn formed. Most optical or photonic waveguides are single-mode (SM), although it is also possible to have multi-mode (MM) waveguides. Although the following description and figures are based on, or assume, the use of optical fiber, it will be understood that the techniques are also applicable to optical or photonic waveguide structures, with cores of varying shape. Similarly, the techniques could be applied to other fiber types, such as multicore fiber, where, depending on the embodiment, the end structure could have a separate aperture for each core, or more than one core could share a common aperture.

Figure 2:
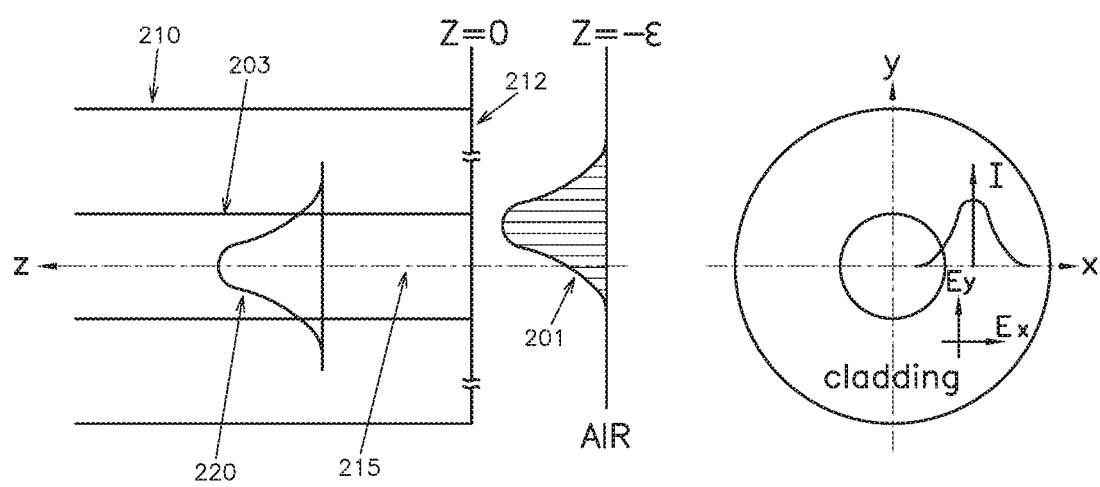
FIG. 2 illustrates the electric field power distribution for an optical beam that is launched into a single mode fiber, with a lateral offset from the center of the fiber core.

FIG. 2 shows a beam, having electric field distribution 201, located in a plane at $Z=-\varepsilon$ in air or vacuum ($\varepsilon$ is a small distance). (Note that in FIG. 2, the positive direction of Z is towards the left of the figure.) The polarization of the beam is in either the X or Y direction. The beam is launched to the fiber end surface 212, located in a plane at $Z=0$, but the beam is substantially offset (laterally) from the fiber core center 215. This sort of lateral beam shift is typical of many types of fiberoptic components that use various forms of beam-steering technologies, such as Variable Optical Attenuators (VOAs). One example of lateral beam shift in a VOA application is shown in the product web site of DiCon Fiberoptics, Inc. Another example of lateral beam shift in shown in U.S. patent application Ser. No. 15/184,722, 2016 and published as US 2017/0363813 on Dec. 21, 2017. Part of the optical power in beam 201 is coupled to the fundamental propagation mode 220 of the single-mode fiber, and the rest is coupled into the fiber cladding, and then leaked out of the fiber 210. As the lateral offset from the core center increases, the optical power that is coupled to the core of fiber 210 decreases. The coupling efficiency is also dependent on the polarization state of the input beam 201, as well as the stress distribution inside the cladding layer, due to differences in the electric field matching at the interface (in accordance with electromagnetics theory) for different polarization states. The difference in the coupling efficiency that results from polarization is called polarization dependent loss (PDL).

Mathematically, the coupling efficiency $\eta_c$ is equal to:

$$\iint_{Z\geq 0} E_a(x,y)E_q(x,y)dS \text{(integrated over the plane surface for } Z\geq 0\text{)},$$

where $E_a$ is the normalized amplitude of the electric field distribution of the input beam for $Z\geq 0$, and $E_q$ is the normalized fundamental mode 220, which is a Gaussian beam. When the input beam 201 enters the fiber end surface 212, the Ea distribution for $Z\geq 0$ is slightly dependent on the polarization state of the incident beam and the stress distribution inside the cladding layer, even though the amplitude distribution of the electric field at $Z=-\varepsilon$ is the same for all polarization states, due to differences in the electric field matching at the interface 203, for different polarization states.

Figure 3A:
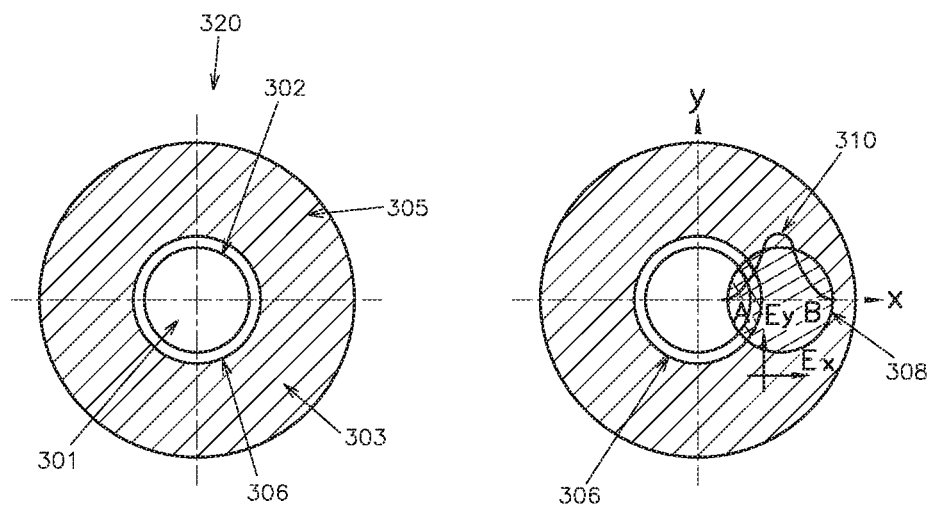
FIG. 3A illustrates an embodiment in which an opaque surface with an aperture is used to largely block light from entering or exiting the cladding layer of an optical fiber.

The techniques presented here present a method for reducing polarization dependent loss (PDL), as well as wavelength dependent loss (WDL) and temperature dependent loss (TDL) due to thermal expansion and contraction changing the alignment of elements. The techniques can also be used to reduce the wavelength passband width of fiberoptic components, by covering up the cladding layer that is adjacent to the fiber core at the fiber end surface with a non-transparent (or opaque) layer, which may consist of one or more sub-layers. In FIG. 3A, 302 indicates the interface of the fiber core 301 and cladding 303. The shaded area 305 denotes the portion of the cladding area that is covered by a non-transparent material, such as a metal. Thus, a pin hole opening or aperture 306 is created on the fiber end surface 320. The pin hole can be substantially the same size as, slightly larger than, or smaller than the fiber core 302.

In the right-hand portion of FIG. 3A, an input beam 308, having an electric field distribution denoted by 310, is incident onto the end surface of an optical fiber, identical in structure to the fiber shown in the left-hand portion of the figure. (The labels shown on the left-hand figure also apply to the right-hand figure.) As shown in FIG. 3A, the input beam 308 is offset laterally from the center of the fiber core. Thus, a majority portion of the input optical power, denoted in the figure as area B, is blocked by the non-transparent material, and only the remaining portion denoted as area A is able to enter (or exit) the optical fiber. Because the optical power of portion A is coupled to the fiber core 301 directly, and the optical power of portion B is blocked by the non-transparent layer outside pin hole 306, the electric field matching at the interface 302 is eliminated. Thus, the influence of polarization on the coupling of portion A into the fundamental propagation mode of the fiber is substantially reduced or limited, in comparison to the case in which there is no pin hole and no non-transparent area. In short, the pin hole or aperture, and the surrounding non-transparent layer, serve to reduce or limit the polarization dependency of the power coupling of an input beam to an SM fiber. Experimental results verify that applying a pin hole or aperture with a diameter that is close to the size of the fiber core can reduce PDL by an order of magnitude, or more.

Figure 3B:
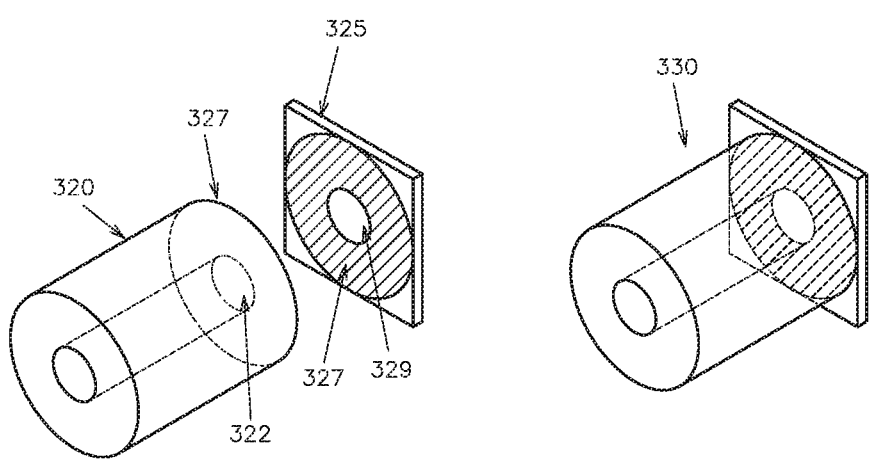
FIG. 3B illustrates one of the methods in which a pin hole or aperture can be imposed on a fiber end surface.

The end structure of the pin hole or aperture on the fiber end surface can be created using UV lithography (as explained later, and shown in FIG. 8), or by attaching a pin hole plate 325 closely to the fiber end 317 as shown in FIG. 3B, as well as through the use of other metal (or other material) deposition methods. In alternate embodiments, a ferrule structure can include a pin hole end plate at the end of the through-hole, into which a fiber can then be embedded. These methods are all within the scope of the present discussion, as long as the pin hole or aperture with surrounding non-transparent layer is closely proximate to a fiber end, to inhibit optical power being coupled into or propagating in the cladding layer. In FIG. 3B, a metallic or other non-transparent layer 327 with a pin hole opening 329 is first printed or deposited on a transparent plate 325 using photo-lithography and chemical etching. Then the pin hole of the plate is aligned with the core 322 of the fiber 320, and the plate 325 is tightly fixed against the fiber end surface 327, as indicated by assembly 330.

Figure 4:
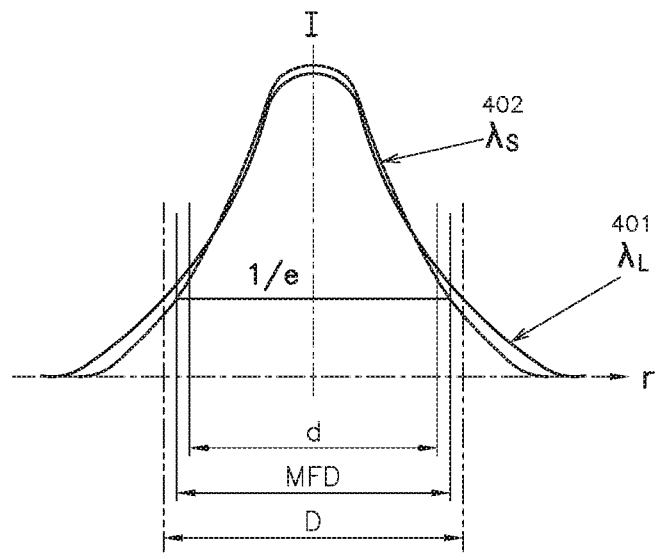
FIG. 4 shows the electric field power distributions of the fundamental modes of two different wavelengths.

As explained above, an SM fiber carries a fundamental mode, whose evanescent field spreads out into the cladding layer. The longer the wavelength $\lambda_L$ the more spread-out it is. As shown in FIG. 4, the amplitudes of two electric fields at a longer wavelength and a shorter wavelength $\lambda_s$ are indicated by the two curves 401 and 402, respectively. In FIG. 4, d represents the core diameter, and the pin hole or aperture diameter is D. The so-called mode field diameter (MFD) is the diameter at which the amplitude of the field decays to lie of the peak amplitude that is located at the core center (e is the mathematical constant that is the base of the natural logarithm, sometimes called Euler's number, and is approximately equal to 2.718). If the fundamental mode of an SM fiber propagates toward a fiber end that has a pin hole or aperture of diameter D, such that the pin hole is lined up with the fiber core and is imposed on the fiber end surface, only light that is within the pin hole is able to exit the fiber end. The optical power of the evanescent field in the fiber cladding is blocked by the non-transparent layer or film that surrounds the pin hole. This results in the total power exiting the fiber being less wavelength dependent, compared to the case without the pin hole or surrounding non-transparent layer. This exiting power may then pass other optical components, before reaching an output port or a photo-detector, at which point a power measurement of the light would show less wavelength dependence. Similarly, the reduced beam size caused by a pin hole and non-transparent layer, either in the input fiber(s) or output fiber(s), results in reduced loss variation from temperature-induced optical coupling changes in the optical elements that lie along the optical path.

Figure 5A:
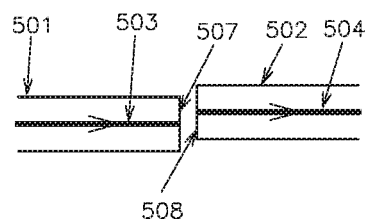
FIGS. 5A and 5B show fiber misalignment in the lateral and angular directions, respectively.
Figure 5B:
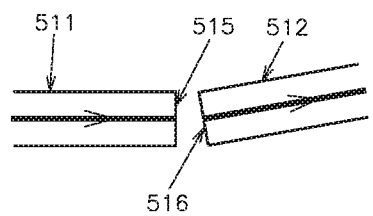

FIGS. 5A and 5B show examples of two fibers that are in lateral mis-alignment and angular mis-alignment, respectively, such as may occur in an optical device or system. In FIG. 5A, an input fiber 501 carrying optical power is coupled to an output fiber 502, with a substantial mis-alignment in the relative lateral positions of the two fiber cores 503 and 504. Both insertion loss (IL) and polarization dependent loss (PDL) are high for this coupling fiber pair. However, if a pin hole or aperture is imposed on either or both of the fiber end surfaces 507 and 508, of fibers 501 and 502, respectively, then the polarization dependent loss of this coupling fiber pair can be reduced significantly. This provides substantial performance advantages for optical components and optical system design, which desire stable optical output regardless of the polarization state of the transmitted optical signal. The penalty for imposing a pin hole in this example is that the insertion loss of the fiber coupling will be increased slightly. In FIG. 5B, the two fibers 511 and 512 are in severe angular mis-alignment. Similarly, a pin hole imposed on either or both of the fiber end surfaces 515 and 516, of fibers 511 and 512, respectively, can significantly reduce PDL.

Figure 6:
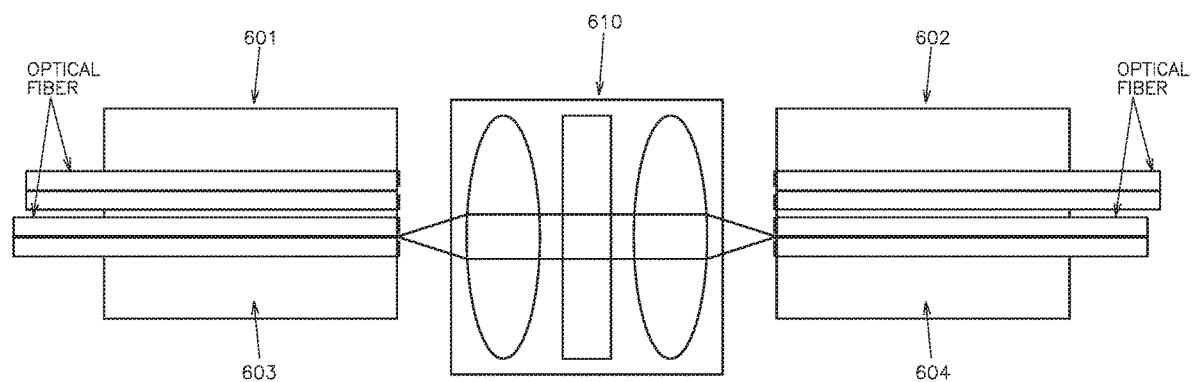
FIG. 6 illustrates a generalized fiberoptic component that has optical elements that are located between a group of input fibers and a group of output fibers.

FIG. 6 illustrates a generalized optical component having one or more optical fibers as a group (only two fibers are shown in the figure) comprising an input port 601, and one or more optical fibers as a group (only two fibers are shown in the figure) comprising an output port 602. The fibers in the input and output ports may be embedded in fiber ferrules 603 and 604, respectively, for optical alignment, positioning, and fixing in place. A generalized assembly of optical elements 610 is positioned between input port 601 and output port 602. Because the transmission characteristics (such as index birefringence) of many optical elements are dependent on the polarization state of the light (at least to some extent), the optical beam that impinges on the output port also depends somewhat on the polarization state. If a pin hole and surrounding non-transparent layer is imposed on one or more of the input and output fibers, the optical power coupling from the input to the output fibers can be made less polarization dependent. In FIG. 6, all of the fibers are shown with an end structure.

Figure 7:
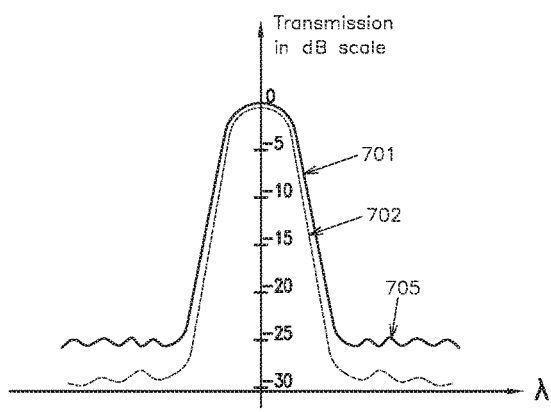
FIG. 7 shows a wavelength spectrum or passband that has been selected, and is being carried or transmitted in an optical fiber.

For spectral-selective (or wavelength-selective) optical components, as described in U.S. Pat. No. 7,899,330 and U.S. patent application Ser. No. 15/081,294, the output port/fiber carries a wavelength spectrum as shown by plot 701 in FIG. 7. Due to wavelength cross-talk, diffraction effects, and scattering caused by the optical elements in the optical path, the selected spectrum (or wavelength) of such an optical component may have limited wavelength isolation, typically about 25 dB, outside of its FWHM (full width at half maximum) passband. This is represented by the bottom portion 705, of spectral curve 701. Maximizing wavelength isolation is highly desirable for optical system design, as it increases the effective signal-to-noise ratio of the optical signals. By imposing a pin hole with surrounding non-transparent layer onto the input fibers, output fibers, or both, the wavelength "noise" on the output ports can be reduced, as indicated by plot 702.

Figure 8A:
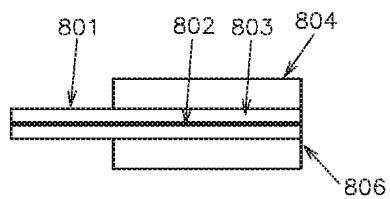
FIGS. 8A-8D illustrate a process for creating a pin hole or aperture directly on the end surface of the core of an optical fiber, using UV lithography.
Figure 8B:
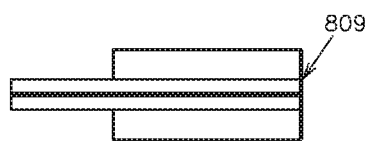
Figure 8C:
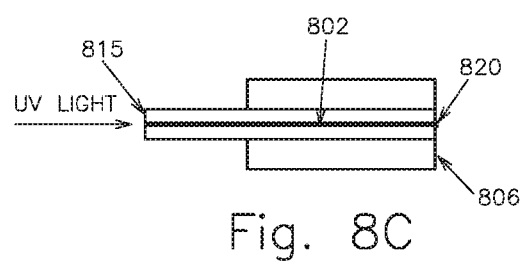
Figure 8D:

FIGS. 8A-8D illustrates some of the stages for an exemplary process for creating a pin hole or aperture, with surrounding non-transparent layer, on the fiber end surface. At FIG. 8A, an optical fiber 801, with fiber core 802 and cladding layer 803, is embedded in a through-hole (or bore or passage) a fiber ferrule 804 (not shown to actual scale), and its end surface 806 is well polished either perpendicular or being slanted with a small angle with respect to the optical axis of the fiber core 802. A photoresist material 809 is then coated on the end surface 806, as shown in FIG. 8B. As indicated in FIG. 8C, UV light, typically with wavelengths ranging from about 230 nm to about 400 nm, is then launched into the fiber core 802 from the other fiber end 815. The UV light is then carried by the fiber core 802 toward the photoresist layer, causing the photoresist material to cure or solidify, in the area above or on top of the fiber core 802. By controlling the UV light intensity and exposure time, the size of the area of cured or solidified photoresist can be tuned. By washing away the un-exposed photoresist, a circular photoresist island 820 is left remaining on top of the fiber core 802. Depending on the UV light intensity and exposure time, the circular photoresist island may be slightly larger or slightly smaller than the fiber core diameter. In FIG. 8D, a thin metal film or a layer (or layers) of some non-transparent material 825 is deposited onto the fiber ferrule end surface 806, typically by using some form of physical or chemical vapor deposition process. The photoresist island 820 is then removed by solvents, such that a pin hole opening or aperture 828 is created in the non-transparent film or layer 825, right on top of the fiber core. The size and placement of the pin hole opening or aperture 828 is directly related the size and placement of the photoresist island 820. The size of the photoresist island 820 in turn depends on the exposed UV dose, while the placement of the photoresist island 820 is self-aligned to the fiber core 802. Thus, by controlling the exposure dose, the pin hole opening size of the end structure can be tuned and controlled. Normally, having a pin hole opening size that is either slightly larger or slightly smaller than the fiber core size, is desired for enhancing the stability of the output optical power without significantly sacrificing power transmission, as described above.

Figure 9:
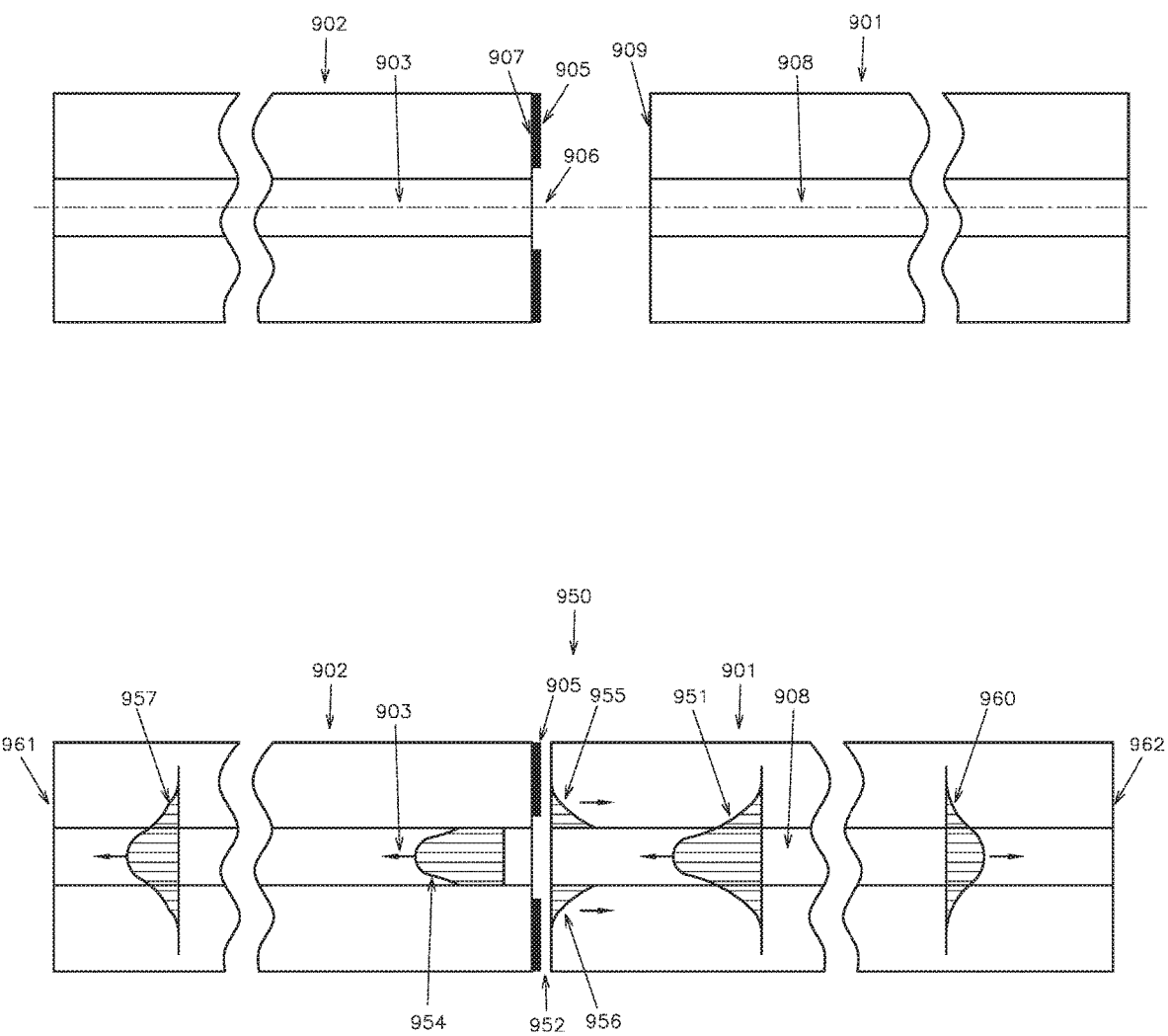
FIG. 9 shows an embodiment in which the non-transparent area surrounding the pin hole or aperture is designed to reflect a portion of the light, back towards the input.

In another embodiment, a fiber with a pin hole or aperture on its end surface can be used to reflect optical power that is contained in the evanescent field of the fundamental mode, as shown in FIG. 9. A fiber 902 has its end surface 907 coated with a non-transparent layer 905, that contains a pin hole 906, located over the fiber core 903. The fiber end surface 907 may be slanted by a small angle, with respect to the optical axis of the fiber core 903. The other fiber 901 has one end surface 909 that is well polished, and may also be slanted with a small angle. Fiber end surface 909 may be coated with an anti-reflection coating. The slanted fiber end face(s) and anti-reflection coating are intended to avoid back-reflection of the optical signal, as well as the formation of an unintended optical cavity between end surface 905 and end surface 909. The two fibers 902 and 901 may be positioned proximate to one another with a small air gap between them, or they may be physically butted against each other, or they may be fused together using a fusion splicing machine, to form a fiber pair assembly, as indicated by 950 in the bottom portion of FIG. 9.

As shown in the bottom portion of FIG. 9, the fundamental mode 951 of fiber 901 propagates along fiber core 908 toward the interface 952, and its power around the mode center 954 is transmitted through the pin hole or aperture, and eventually turns into the fundamental mode of fiber 902, with smaller amplitude, as represented by 957. However, its evanescent field 955 is reflected by the non-transparent (and reflective) layer 905, back to fiber 901. Although most (or even all) of the optical power of reflected evanescent field 955 is coupled into the cladding layer of fiber 901, a portion of the reflected evanescent field will eventually be partially coupled into the core of fiber 901, as fundamental mode 960, with a much smaller amplitude. The reflected optical power 960, exiting the other end 962 of fiber 901, can be used for monitoring the optical power level carried by the incoming fundamental mode 951 in the fiber 901, or it can be used for other optical processing. The fiber end 962 can be slanted by a small angle (although this is not shown in FIG. 9) with respect to the optical axis of fiber core 908, such that the reflected power 960 exits fiber 901 into free space with a small angle (also with respect to the optical axis of the fiber core 908), for easy detection by an optical receiver or photo-detector. The transmitted (output) optical power 957, at the output end 961 of fiber 902, has the benefits of low polarization, temperature, and wavelength dependence, as described above. It should be noted that the transmission of light in fiber pair 950 is optically bidirectional. Fiber 902 may be used as the input fiber, and fiber 901 may be used as the output fiber, as long as the non-transparent layer 905 is reflective on both sides.

The foregoing detailed description has been presented for purposes of illustration and description. It is not intended to be exhaustive or to limit the invention to the precise form disclosed. Many modifications and variations are possible in light of the above teaching. The described embodiments were chosen in order to best explain the principles involved and their practical application, to thereby enable others skilled in the art to best utilize the various embodiments and with various modifications as are suited to the particular use contemplated. It is intended that the scope of the invention be defined by the claims appended hereto.

It is claimed:

1. An optical component, comprising:
    a first optical fiber terminating in a first end and having an inner core radially surrounded by an outer cladding, the inner core having a higher index of refraction than an index of refraction of the outer cladding;
    a second optical fiber terminating in a second end and having an inner core radially surrounded by an outer cladding, the inner core having a higher index of refraction than an index of refraction of the outer cladding, the second end of the second optical fiber proximate to the first end of the first optical fiber; and
    a reflective end structure covering the first end of the first optical fiber and having a transparent aperture, the first and second optical fibers aligned such that light transmitted from the inner core of the second end of the second optical fiber and incident on the reflective end structure is transmitted through the transparent aperture to the inner core of the first end of the first optical fiber, and the first and second optical fibers are further aligned such that at least a portion of light transmitted from the second end of the second optical fiber that is incident upon the reflective end structure is reflected back toward the second end of the second optical fiber, and the optical component is configured to monitor the light reflected toward the second end of the second optical fiber and propagated back through the second optical fiber.

2. The optical component of claim 1, wherein the reflective end structure is formed on the first end of the first optical fiber.

3. The optical component of claim 1, wherein the reflective end structure is formed on the second end of the second optical fiber.

4. The optical component of claim 1, wherein the reflective end structure is formed on a plate separate from the first end of the first optical fiber and the second end of the second optical fiber.

5. The optical component of claim 1, further comprising:
    a ferrule in which the first optical fiber is embedded, wherein the reflective end structure is part of the ferrule.

6. The optical component of claim 1, wherein the optical component is further configured to determine an optical power of the at least a portion of the light reflected back onto the second end of the second optical fiber.

7. The optical component of claim 1, further comprising:
    a photodetector, wherein the photodetector is configured to monitor the at least a portion of the light reflected back onto the second end of the second optical fiber.

* * * * *